United States Patent Office 3,535,188
Patented Oct. 20, 1970

3,535,188
STITCHING APPARATUS
Edwin E. Mallory and Leon J. Cole, Niles, Mich., assignors to National-Standard Company, Niles, Mich., a corporation of Delaware
Filed Dec. 4, 1967, Ser. No. 687,561
Int. Cl. B29h 17/08
U.S. Cl. 156—412        5 Claims

ABSTRACT OF THE DISCLOSURE

Apparatus for stitching strip material, such as tire tread material, onto the periphery of an annular object, such as a tire carcass, during rotation of the latter embodying an endless belt which is brought into engagement with the strip material to stitch the same to the periphery of the annular object.

---

By way of example the invention importantly has utility in applying tire tread material to a suitably prepared tire carcass, wherein it is important to avoid entrapping air between the tire tread material and the crown of a tire carcass to assure satisfactory adhesion of the tread to the carcass. Further and especially in applying so-called hot tread material to the crown of a tire carcass, it is important to maintain the dimensional stability of the tread material so that the resulting tire in in good balance. Further, it is common practice in the art to apply tread material in the form of a preformed camel back component of predetermined dimension for a predetermined tire size which is of disadvantage in that a large number of such camel backs of the wide variety of dimensions must be maintained in supply to enable the treading of carcasses for tires of different sizes.

The present invention addresses itself to an apparatus which when utilized for applying tread material to a tire carcass satisfactorily meets all the foregoing desirable requirements and overcomes the disadvantages of known apparatus which are defective in one or more of the above respects.

In prior art stitching devices, it is common to provide an array of rollers rotatably mounted in a frame and which are adapted to be brought into engagement with tire tread material laid on the tire carcass and moved transversely of the tire carcass as it is rotated to stitch the tread material onto the crown of the tire carcass. In such known apparatus, such important aspects of avoiding air entrapment and supporting the tread material to maintain dimensional stability are absent. Also, many of such known apparatus are suitable only for applying camel back thead components to a tire carcass and are thus of limited use.

According to the present invention, the above advantages are achieved and the disadvantages are avoided, by providing a stitching apparatus embodying essentially an endless belt which may be readily engaged with the tire tread material laid on the crown of the tire carcass, and with the arrangement being such that upon rotation of the tire carcass a first central portion of the tread material is stitched to the center of the crown of the tire carcass, and thereafter side portions of the tread material are stitched to side portions of the crown of the tire carcass. Such progressive stitching of the tread material prevents or avoids entrapment of air between the tire tread material and the crown of the tire carcass. Also of importance in the present invention is the provision of pressure roller means which are operative to sequentially apply pressure to the tread material at the center portion of the tread material after stitching of such portion of the tread material to the crown, and thereafter provide for pressure engagement of the side portions of the tread material at opposite sides of the crown and after such portions have been initially stitched to the tire carcass.

The invention is of further advantage in the application of tire tread material in strip form to a tire carcass by reason of the action of endless belt tending to compact the splice at the abutting ends of the strip of tire tread material applied around the carcass.

A still further advantage of the invention enables the slow rotation of the tire carcass as compared to prior art devices which eliminates the effect of centrifugal force acting to throw the tire tread material away from the carcass.

The above and other objects and advantages of the invention will be apparent from the following detailed description of a preferred embodiment of the invention.

Now in order to disclose to those skilled in the art the manner of constructing and operating an apparatus in accordance with the present invention, there shall be described in connection with the accompanying drawings a preferred embodiment of the invention.

Figure 1:
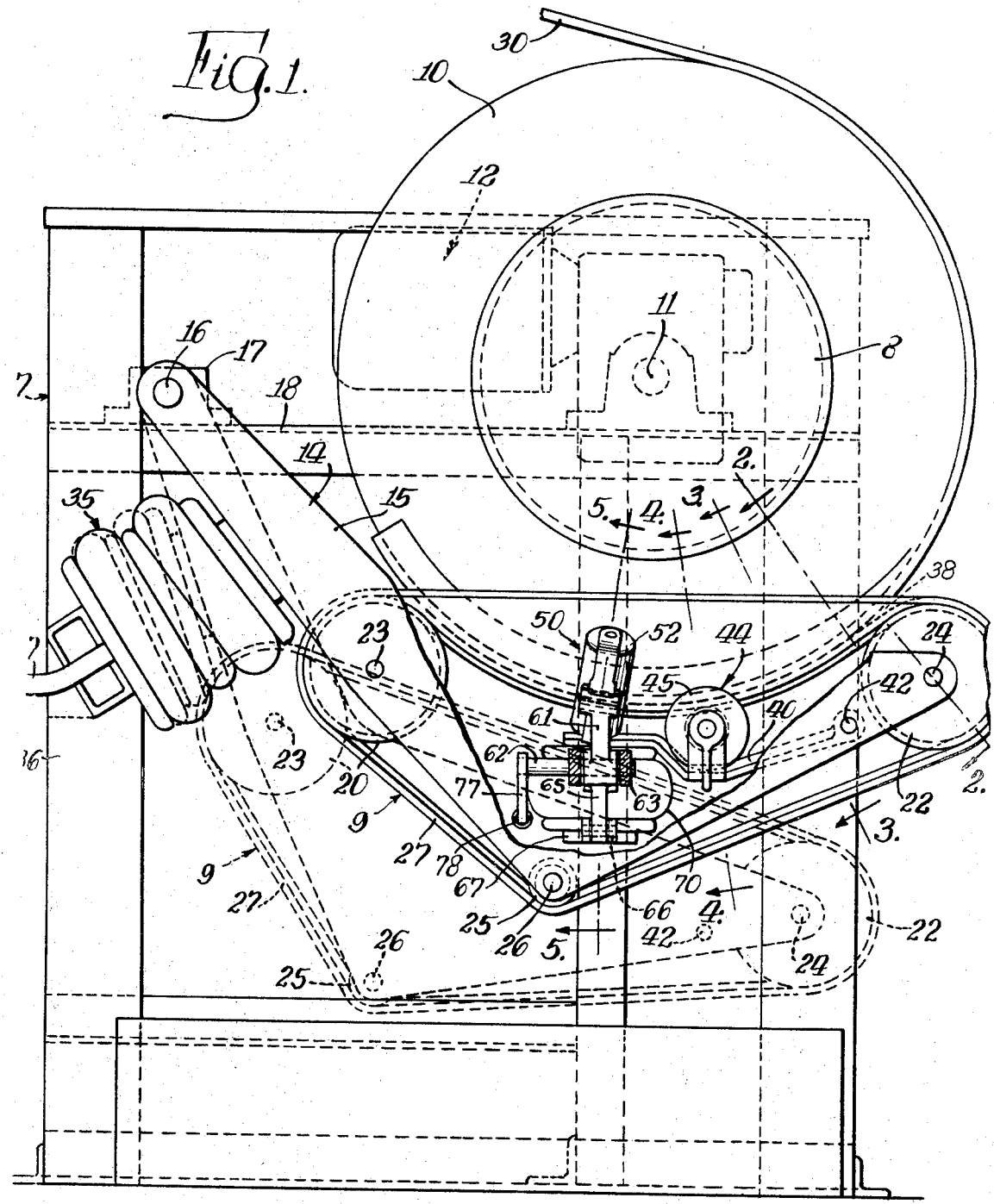
FIG. 1 is a side elevational view of an apparatus constructed in accordance with the present invention in which a portion of belt frame means of endless belt means for stitching tire tread material to a tire carcass is broken away to illustrate primarily certain pressure roller means of the apparatus.
Figure 4:
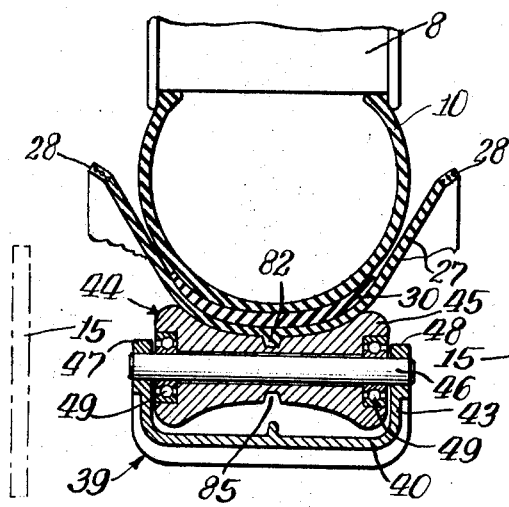
Figure 5:
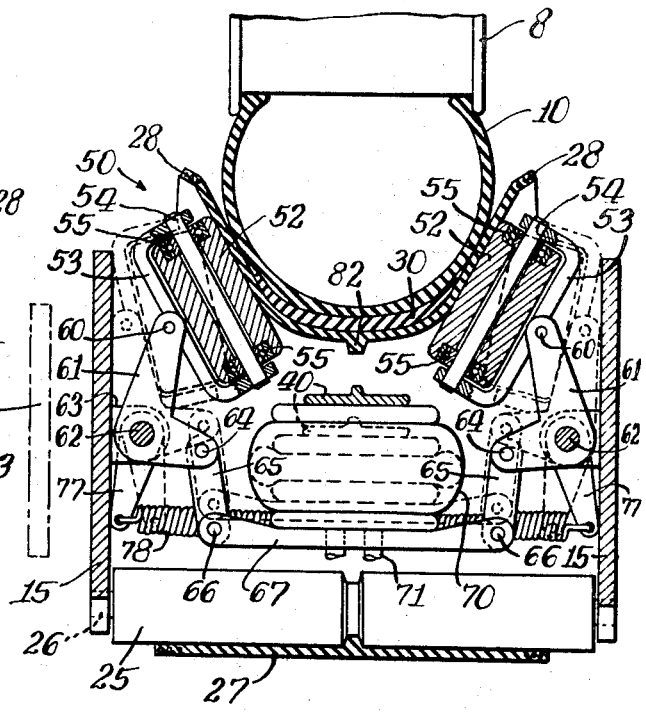

FIG. 4 is a detail sectional view taken substantially along the line 4—4 on FIG. 1 looking in the direction indicated by the arrows and showing first pressure roller means for effecting pressure engagement of the center portion of the tire tread material to the central portion of the crown of the carcass; and FIG. 5 is a detail sectional view taken substantially along the line 5—5 on FIG. 1 looking in the direction indicated by the arrows and showing second pressure roller means for effecting pressure engagement of the side wall portions of the tire tread material with the side portions of the crown of the tire carcass.

The apparatus shown in FIG. 1 comprises a main frame 7 which provides for the support of known chuck means 8, and endless belt means indicated generally at 9. The chuck means 8, which, by way of example, may be of the construction shown and described in U.S. Pat. No. 2,960,130, dated Nov. 15, 1960 to J. A. Smyser to provide for supporting a tire carcass or casing 10 for rotation about its rotational axis 11. As described in the foregoing patent the chuck means 8 is radially expansible and contractible for mounting and demounting of a tire carcass or casing. The tire carcass 10 may, for example, be a carcass from which a worn tread has been removed and which it is desired to retread. The tire carcass is mounted on the chuck means in the collapsed position of the latter and after which the chuck is radially expanded to firmly hold the tire carcass. The tire carcass when mounted on the chuck may, as shown and described in the above-mentioned U.S. patent, be charged with air under pressure or ohterwise rigidly and firmly supported so that the outer peripheral surface of the tire carcass is firm for the application of tire tread material to the crown of the carcass. A motor, such as indicated generally at 12, provides for rotating the chuck means for rotating the tire carcass about its rotational axis 11.

The endless belt means 9 comprises belt frame means 14 having laterally spaced apart crank arms 15 which are pivotally mounted at their outer upper ends upon mounting means defined by pivot pin 16 supported in a bracket member 17 rigidly secured to an upper horizontal frame member 18 of the main frame 7.

The endless belt means 9 further comprises a pair of belt rollers 20 and 22, mounted for rotation on axles 23 and 24, respectively, between the spaced apart crank arms 15. A belt slack guide roller 25 is supported for rotation upon an axle 26, the opposite ends of which are supported in the spaced apart crank arms 15 for supporting the roller 25 therebetween. An endless belt 27 preferably of rubber or other like elastomeric material is trained about the belt rollers 20 and 22 and take-up roller 25. The side edge portions of the belt 27 are desirable reinforced in the lengthwise direction of the belt by substantially inextensible cord reinforcing means 28 embedded in the material of the belt.

As best seen in FIG. 1 the crank arms 15 are pivoted at 16 to provide for movement of the endless belt means toward and away from the periphery of the tire carcass 10. In the operative stitching position of the belt 27, as shown in full lines, the axes of rotation of belt rollers 20 and 22 lie at opposite sides of and in parallel relation with the axis of rotation of the tire carcass. In the operative stitching position of belt 27 the axes of rotation of the belt rollers 20 and 22 also lie outwardly of and between the outer periphery and axis of rotation of the tire carcass so that the upper run of belt 27 has an arcuate configuration imparted to it in its lengthwise and transverse directions with the resultant convex configurations of the upper surface of the belt providing for stitching the tire tread material to the crown of the carcass as described in detail below.

Positioning means, such as air spring 35, for effecting movement of endless belt means 9, is arranged between the belt frame means 14 and a vertical standard 36 of the main frame 7. An air hose 37 extending from a source of air under pressure has connection with the air spring 35. Upon admission of air under pressure to the air spring 35 the endless belt frame means 14 is rotated in a counter clockwise direction about the axis of the pivot pin 16, as viewed in FIG. 1, to dispose the endless belt 27 in position for stitching the tire tread material to the tire carcass. Upon exhausting air from the air spring 35 the endless belt frame means 14 returns to its inoperative position. Preferably the pivot axis of pivot pin 16 and the rotational axis of roller 22 provided by axle 24 are geometrically arranged with respect to each so that in the operative stitching position of endless belt 27 a wedge shaped opening, as at 38, is formed between the belt at roller 22 and the outer periphery of the carcass 10 to facilitate initially stitching of the tread material to the carcass.

In FIG. 1, as previously noted, the endless belt 27 is shown in full lines in its operative stitching position for stitching tire tread material to a tire carcass and in dotted lines in its inoperative position.

Figure 2:
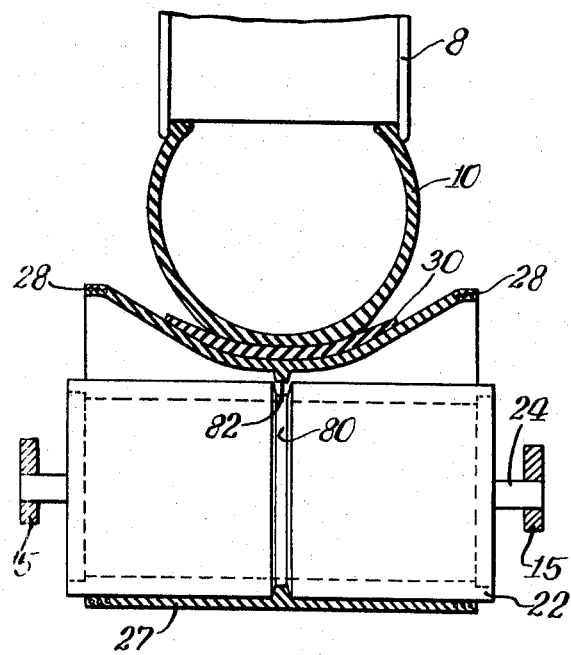
FIG. 2 is a detail sectional view taken substantially along the line 2—2 on FIG. 1 looking in the direction indicated by the arrows, and illustrating the initial stitching of a center portion of the tire tread material to the central portion of the crown of the tire carcass.
Figure 3:
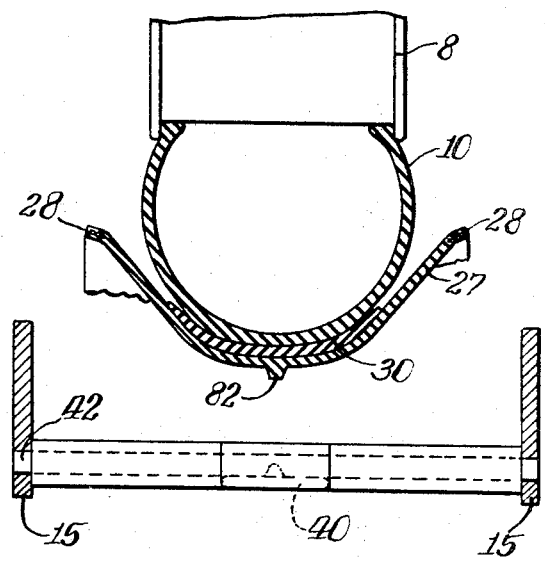
FIG. 3 is a detail sectional view taken substantially along the line 3—3 on FIG. 1 looking in the direction indicated by the arrows, and illustrating the initial stitching of side portions of the tire tread material to side portion of the crown of the tire carcass.

In the structure thus far described, upon positioning of the endless belt 27 to its stitching position, the upper run of the endless belt is displaced providing the outer surface with transverse and circumferential convex configurations for stitching tire tread material to the crown portion of a tire carcass. The tread material to be applied to the tire carcass may be a preformed camel back component, or as shown in the drawing, may be tire tread material of desired cross sectional configuration fed hot from an extruder onto the crown portion of a carcass 10 upon rotation of the latter in the clockwise direction as seen in FIG. 1. The leading portion of the tire tread material 30 layed on the crown of the carcass is initially engaged between the upper run of the belt 27 at belt roller 22 as illustrated in FIG. 2, and from which it will be seen that the upper run of the belt is of minimum concavity and rather shallow but of a configuration to effect stitching of the center portion of the tread material to the center portion of the carcass. As rotation of the tire tread material and tire carcass continues and as seen in FIG. 3, the concavity and transverse convex surface of the belt deepens and side portions of the belt approach the sides of the crown of the tire carcass to effect subsequent stitching of the side portions of the tire tread material to the sides of the crown of the carcass.

The foregoing sequence of stitching of the center portion of the tire tread material to the center portion of the crown of the tire carcass followed by the subsequent stitching of the side portions of the tire tread material to the side portion of the crown of the tire carcass eliminates the possibility of entrapment of air between the tire tread material and the crown of the carcass. Further the speed of stitching is considerably enhanced.

In the construction thus far described, it will be observed that the tire tread material is stitched progressively from the center of the crown of the tire carcass to the outside edges thus forcing air laterally outwardly and eliminating trapping of air bubbles between the tire tread material and the crown of the carcass.

In many instances tire tread material may be satisfactorily applied to a tire carcass by the endless belt 27 upon completion of the foregoing operations and especially in instances where good adhesion characteristics exist between the tire tread material and carcass. However, it may be desirable under some circumstances to effect pressure engagement of the initially stitched portions of the tire tread material with the crown of the tire carcass. For such purposes a pressure roller assembly 39 may be associated with the endless belt means 9. As best seen in FIG. 1 the pressure roller assembly comprises a frame 40 pivotally mounted on a pin 42 extending between the crank arms 15.

The pressure roller assembly 39 as seen in FIGS. 1 and 4 is formed with a U-shaped frame member 43 providing for the support of first pressure roller means 44. The first pressure roller means 44 comprises a first pressure roller 45 supported for rotation on a pin 46 extending between the arms 47 and 48 of the U-shaped frame member 43. Suitable bearing assemblies, indicated at 49, are disposed about the pin 46 inwardly of the inward surfaces of the arms 47 and 48.

Second pressure roller means, indicated at 50 and as best seen in FIGS. 1 and 5 comprises a pair of second pressure rollers 52 adapted to be disposed at opposite sides of the tire tread material and tire carcass. The second pressure rollers 52 are each mounted in U-shaped frames 53 on pins 54 extending through the arms of the U-shaped frame members. Suitable ball bearing assemblies 55 are arranged about the pins 54 inwardly of the arms of the U-shaped frame members 53. The U-shaped frame members 53 are each pivotally mounted centrally of the ends thereof on pins 60 at the ends of bell cranks 61 which, in turn, are pivoted, as at 62 in bifurcated brackets 63 inwardly at the inner surfaces of the spaced apart crank arms 15. The other ends of each of the bell cranks 61 have pivotal connection at 64 with a link 65, and which links at their opposite ends have pivotal connections as at 66 with a transversely extending frame member 67. A crank arm 77 is made fast to each of the shafts 62 with the outer ends of the crank arms 77 being connected by a coil spring 78 to normally bias the second pressure rollers from their operative positions as shown in full lines to their inoperative positions as shown in dotted lines in FIG. 5. The first and second pressure roller means are adapted to be positioned to their operative positions by means of a suitable air spring 70 disposed between the transverse frame member 67 and the frame 40. Upon admission of air under pressure as through conduit 71 the air spring 70 may be expanded to effect pivotal movement of pressure roller frame means 40 about the pivot 42 to dispose the first pressure roller means 44, and the pair of second pressure roller means 50 to position for effecting pressure engagement of the tire tread material with the tire carcass. As best seen in FIG. 4, the first pressure roller 45 is adapted to effect pressure engagement of the center portion of the tire tread material with the center portion of the crown of the tire carcass followed by the pressure engagement by the pair of second pressure roller means 50 to effect pressure engagement of the side portions of the tire tread material with the side portions of the crown of the tire carcass. Thus it will be seen by reason of the provision of the first and second pressure roller means 44 and 50, respectively, that after initial stitching of the center and side portions of the tire tread material to the center and side portions of the crown of the tire carcass, pressure engagement of the central portion of the tire tread material of the tire carcass is effected followed by the subsequent pressure engagement of the side portions of the tire tread material with the sides of the crown of the tire carcass. Further in this regard, it will be observed that the coil spring 78 assures engagement of first pressure roller 45 with the tire tread material before the pressure engagement of the second pressure rollers 52 with the sides of the tire tread material. It will be noted that the axis of the pins 54 mounting the second pressure rollers 52 in the operative stitching position lie at opposide sides of the tire tread material and tire carcass and extend downwardly and angularly inwardly toward each other to effect engagement of the side portions of the tire tread material with the tire carcass.

Preferably the belt rollers 20 and 22 are each formed with an annular center groove, such as shown at 80 in belt roller 22 in FIG. 2, and the endless belt 27 is preferably provided with a rib 82 at its inner surface having mating engagement with the annular grooves in the belt rollers to maintain the belt 27 in proper position in travelling about the belt rollers and thus prevent lateral shifting of the belt in effecting the foregoing stitching operations. Also, for this purpose the first pressure roller 45 may also be formed with a center annular groove 85 for guiding engagement with the rib 82 on the inner surface of the endless belt 27.

In applying hot tread material, such as indicated at 30, the material is fed from the extruder as the tire carcass is rotated and the tread stock 30 may be severed from the extruder upon a complete revolution of the tire carcass. In most instances a single revolution of the tire carcass is sufficient to effect stitching of tread material thereto but it will be understood two or more revolutions of the tire carcass may be effected in securing adhesion of the tire tread material to the tire carcass. As before indicated, a suitably preformed camel back component may be applied to the crown of the carcass of the tire and stitched to the tire in the manner above described.

The apparatus of the present invention has utility for use with tires of any desired size. The mounting of the endless belt means enables movement of it inwardly toward the center of the axis of rotation of the carcass to bring the endless belt 27 into proper stitching relation with respect to tread material mounted on the carcass. Further it will be seen that the stitching may be done while the tread is being applied to the carcass. However, it will be understood that the tread may be applied to the carcass before the stitching operation. The stitching may be done in a single revolution of the tire carcass or, if desired, may be done in several revolutions at low speeds of the tire carcass. A still further important feature of the invention is that the endless belt does not stretch the tread material widthwise. Also it will be understood that the apparatus of the invention may be readily employed for the application of strip material to the outer periphery of an annula object and is not limited to the stitching of the tread material to a tire carcass.

While there has been shown and described certain preferred embodiments of the invention, it will be understood that various modifications and rearrangements may be made therein without departing from the spirit and scope of the invention.

The invention claimed is:

1. An apparatus for stitching strip material onto the periphery of a rotatable annular object comprising chuck means for supporting the annular object for rotation about its axis of rotation, endless belt means including an endless belt for engaging said strip material on said annular object to stitch the strip material to said annular object upon rotation of the latter, mounting means for mounting said endless belt means to dispose said endless belt in engaging and disengaging relation with respect to the strip material on said annular object, said endless belt means comprising spaced apart belt rollers for supporting said endless belt with the outer surface of the run thereof between said belt rollers in the engaged position of said endless belt with said strip material of successive configurations of first stitch a central portion of said tread material to a center portion of said annular object, and thereafter stitch side portions of said strip material to the side edge portions of said annular object, first pressure roller means for pressing said central portion of said strip material against the center portion of said annular object after stitching of said central portion of said strip material to the center portion of said annular object, and second pressure roller means for pressing said side edge portion of said strip material against said side edge portion of said annular object after stitching of said side edge portions of said strip material to the side edge portions of said annular object.

2. An apparatus for stitching tire tread material layed on the periphery of a crown of a rotatable annular tire carcass comprising chuck means for supporting the tire carcass for rotation about its axis of rotation, endless belt means comprising belt frame means, a pair of spaced apart belt rollers mounted on said belt frame means, an endless belt trained around said spaced apart rollers, mounting means for said endless belt means to dispose the axes of rotation of said belt rollers to opposite sides of and in parallel relation to the axis of rotation of said tire carcass and outwardly of and between the outer periphery and axis of rotation of said tire carcass to engage a run of said endless belt between said belt rollers with the tire tread material, whereby upon rotation of said tire carcass, said endless belt first effects stitching of a central portion of the tread material to the center portion of the crown of said tire carcass, and thereafter effects stitching of side portions of the tread material to the side edge portions of the crown of said tire carcass, pressure roller frame means pivotally connected to said belt frame means, first pressure roller means rotatably mounted in said pressure roller frame means for pressing said central portion of said tread material against the center portion of the crown of said carcass after stitching of said central portion of the tread material to the center portion of the crown of said carcass, second pressure roller means rotatably mounted in said pressure roller frame means for pressing said side edge portions of the tread material against the side edge portions of the crown of said carcass after stitching of the side edge portions of the tread material to the side edge portions of the crown of said carcass.

3. The apparatus of claim 2 characterized by the provision of first biasing means between said belt frame means and said pressure roller frame means for biasing said first and second pressure roller means into engagement with the tread material on said tire carcass.

4. The apparatus of claim 3 characterized by the provision of positioning means for selectively moving said belt frame means toward and away from said tire carcass to dispose said endless belt in engaging and disengaging relation with respect to the tire tread material on said tire carcass.

5. An apparatus for stitching strip material onto the periphery of a rotatable annular object comprising chuck means for supporting the annular object for rotation about its axis of rotation, endless belt means including an endless belt for engaging said strip material on said annular object to stitch the strip material to said annular object upon rotation of the latter, mounting means for mounting said endless belt means to dispose said endless belt in engaging and disengaging relation with respect to the strip material on said annular object, said endless belt means comprising spaced apart belt rollers for supporting said endless belt with the outer surface of the run thereof between said belt rollers in the engaged position of said endless belt with said strip material of successive configurations to first stitch a central portion of said tread material to a center portion of said annular object, and to stitch side portions of said strip material to the side portions of said annular object, first pressure roller means for pressing said central portion of said strip material against the center portion of said annular object, and second pressure roller means for pressing said side edge portions of said strip material against said side edge portions of said annular object.

References Cited

UNITED STATES PATENTS

| | | | |
|---|---|---|---|
| 1,041,544 | 10/1912 | Williams | 156—412 X |
| 2,088,889 | 8/1937 | Wikle | 156—409 |
| 2,544,390 | 3/1951 | Mallory | 156—409 |

BENJAMIN A. BORCHELT, Primary Examiner

S. C. BENTLEY, Assistant Examiner

U.S. Cl. X.R.

156—413